United States Patent Office 2,835,602
Patented May 20, 1958

2,835,602

CEMENTITIOUS MIXES

Roland G. Benner, Summit, N. J.

No Drawing. Application November 22, 1957
Serial No. 698,027

4 Claims. (Cl. 106—76)

This invention relates to novel compositions and to methods for preparing them. In one of its more specific aspects this invention is directed to the class of substantially dry mixes which are packaged and marketed in the retail trade as "do it yourself" products to be used for making concrete, mortar, stucco, plaster and the like, generally used for patching and repairs about the home.

Prior to this invention, there have been marketed for such purposes packaged mixtures generally consisting of (A) one or a combination of two or more aggregate materials such as sand, gravel, crushed stone, slag or the like, and (B) a finely divided, powdery water-settable material, such as hydraulic cement. These components were mixed together in the substantially dry state and packaged in cartons, bags or the like, stored and shipped to the various wholesale and retail outlets from which they are purchased by the consumer for use by him. It has many times happened that when the consumer opened the package, and requiring only about half of its contents for his purpose for example, poured out half of the contents, finds that the cement is not present in the required amount, and that in most part is to be found in the other half thereof in the container. Consequently, it became necessary for him to dump out the entire contents, and to mix it to obtain uniformity and then to return to the container, that half which is not to be used at that time. In addition to the inconvenience caused by the necessity of remixing and replacing into the container, the portion which is not to be used at the time, this unnecessary exposure of the portion not to be used, to moist air and/or carbon dioxide of the air is deleterious to the product. The reason that the components are not uniformly distributed is because, due to the agitation of the packaged mix in the course of transportation, the finer particles and especially the cement tends to and does travel to the bottom of the container, so that the lower part of the mass is rich and the upper part thereof is deficient in that component.

Cuno in his Patent 2,439,650 of April 13, 1948, discloses a procedure for making weatherproof granules by mixing expanded slag granules with a solution of magnesium fluosilicate and then adding lime or cement which reacts with the magnesium fluosilicate to form a hard coating of calcium fluosilicate.

Headson in his Patent 933,036 of August 31, 1909, suggests the mixing of dry components, iron, iron sulfate, calcium sulfate, hydraulic cement, graphite and sodium silicate as a dry mix to which water may be added to make a paste for repairs.

Also prior to this invention, others have proposed the production of various masonry products by forming a plastic mass consisting of Portland cement, sand, limestone, oxide of iron, alkaline silicate and water as shown by the Crawford Patent 128,365 of June 25, 1872. According to the patentee, the plastic mass is worked to homogeneity when it is ready to be molded in the form desired.

According to this invention, I have provided relatively dry mixes useful for the aforesaid purposes and being such that the packaged mixtures upon storage and transportation will remain substantially uniform, and the components thereof will not excessively separate out due to the vibration of the mix which occurs in the handling and transportation thereof. The novel and unique method which I preferably employ is to coat the aggregate material (A) with a water soluble alkali silicate such as sodium silicate or potassium silicate. Coating of the aggregate material may be accomplished in a variety of different ways, for example by adding thereto a solution of the silicate and mixing the mass to film coat the individual parts of the aggregate with a film or coating of said solution, or by the use of a spray. Then the coated individual parts of the aggregate are preferably subjected to a drying action whereupon the solvent, generally water, is evaporated therefrom. In this operation generally conducted at elevated temperature, practically all of the water but not all is removed whereby the individual units of the aggregate (A) are coated with an almost dry, yet tacky film. At this stage, the cement in a very finely pulverized or powdery condition is added thereto and mixed therewith either in a tumbling barrel or by any other means for agitation, whereby these very fine particles of cement become embedded in and tenaciously adhere to the tacky film to provide a dry dust coating on said film, with substantially all of the cement being carried by the films on the aggregate material. The resultant composition then is packaged and is free flowing mass which will not mass on storage and is ready for use and also there will be no excessive separating out but on the countrary homogeneity will be retained in spite of vibration in transportation or during storage. In such compositions, the tacky films act as binders for the cement which is held on the surface of the aggregate as a dry dust coat. Inasmuch as some reaction occurs between the silicate and cement, it is essential that a low ratio of silicate to cement be used. Otherwise the resulting product will not form concrete, mortar, stucco or plaster of suitable strength when mixed with water by the consumer.

An alternative procedure which may be used to apply a tacky film of silicate to the aggregate is to spray the aggregate with a concentrated solution of silicate at elevated temperature so that no additional drying action is required although it is preferable in some instances.

The following examples are given by way of illustrating the invention and are not to be taken by way of limitation, all parts being given by weight unless otherwise specified in each of the examples and wheresoever otherwise employed throughout the present description and claims:

*Example 1.—(0.011 part of silicate to 1 part cement)*

31.8 parts of dry sand were mixed until thoroughly wet throughout with 3.6 parts of a 5–6% aqueous solution of sodium silicate (0.2 parts as 100% sodium silicate) with the ratio of $Na_2O$ to the $SiO_2$ of said silicate being 1 to 1.8 by weight. While being constantly mixed this mixture was heated by hot air to drive off practically all of the water from the films of the sodium silicate on the individual particles of sand, which films were practically dry, yet were tacky. The source of heat was removed and while still being constantly mixed, there were added thereto 18.9 parts of commercial Portland cement which of course is in the powdery condition and the mixing was continued for 30–60 minutes whereupon the cement became embedded in and provided a dust dry coat on the films of the individual sand particles. Then the resultant composition was poured into water proof bags, then sealed from the atmosphere. A bagged sample was placed in the rear compartment of an automobile to subject it to vibration over a several weeks period. At the end of that time, the bag was opened and the contents examined, and this examination revealed no noticeable separation of sand and cement. This was compared with a mixture of 31.8 parts of sand and 18.9 parts of cement in another bag subjected to the same conditions and upon examination, it was found that appreciable and significant separation of the sand and cement had occurred.

*Example 2.—(0.011 part silicate to 1 part cement)*

63.6 parts dry sand, 10.1 parts of 2% aqueous solution of sodium silicate (1.0 $Na_2O$ to 3.9 $SiO_2$), 18.9 parts of commercial Portland cement.

Employing the same procedure and sequence of steps as that of Example 1 but using the above recited proportion of components, there was obtained a pre-mix similar to that of Example 1 and showed no separation of sand and cement when tested in the manner described in Example 1.

*Example 3.—(0.02 part silicate to 1 part cement)*

63.6 parts of an aggregate consisting of 35% sand and 65% gravel, 7.3 parts of 5% aqueous solution of potassium silicate, 18.9 parts of commercial Portland cement.

Following the same procedure and sequence of steps as that set forth in Example 1, except that the above recited 63.6 parts of aggregate and 7.3 parts of dilute solution of potassium silicate were respectively substituted for the sand and sodium silicate solution of Example 1, the resultant pre-mix was further tested as follows:

The pre-mix was shaken on a 20 mesh screen and the portion retained on the screen was mixed with water to form a stiff paste which was allowed to set for 48 hours. At the end of that period the mass was a hard concrete.

For comparison a mixture of 63.6 parts of like aggregate was mixed with 18.9 parts of Portland cement. This two component mix was screened on the same 20 mesh screen and the portion remaining on the screen was mixed with water to stiff paste which was allowed to set for 48 hours. At the end of that period it was found to have no strength and fell apart on handling.

This test shows that the pre-mix embodying this invention while being dry and fine flowing retains sufficient cement on the aggregate through the binding agent, namely the film of potassium silicate while a combination without such films does not retain sufficient cement on its surfaces for the intended purpose of use.

The foregoing illustrates my invention but many variations may be made without departing from the spirit thereof.

Aggregate is chemically inert material consisting of sand, slag, gravel and/or crushed stone etc. useful in producing concrete, and such aggregates are known as concrete-aggregate. For preparation of the pre-mixes described above, it may vary in size from material retained by a 100 mesh screen to material which will pass a 1 inch mesh screen. The proportion of fine aggregate such as sand to coarse aggregate such as gravel or crushed stone will depend on the product desired. For instance, a pre-mix for cement mortars would be made with fine aggregate as described in Examples 1 and 2. Whereas, a pre-mix for concrete would be made with a mixture of fine and coarse aggregate as described in Example 3.

The quantity of cement used depends on the desired strength of the mortar or concrete. A rich or strong pre-mix may contain 70 parts by weight of cement per 100 parts by weight of aggregate while a lean or weak pre-mix may contain as little as 10 parts by weight cement per 100 parts by weight of aggregate. Preferably, 15 to 30 parts by weight of cement per 100 parts by weight of aggregate are used for concrete mixes. Whereas, 25 to 60 parts by weight of cement per 100 parts by weight of aggregate are preferred for cement mortar mixes.

The quantity of sodium silicate or potassium silicate (dry basis) may vary from 0.1% by weight of the weight of aggregate to 5.0% by weight of the weight of the aggregate, the preferred amounts being 0.2 to 1.0% by weight of the weight of aggregate. Smaller quantities do not sufficiently coat the aggregate for adherence of the cement to the aggregate. Larger amounts merely increase the cost of the pre-mix and have a detrimental effect on the strength of concrete, stucco, or mortar prepared from the pre-mix.

As mentioned above it is desirable to use a low ratio of silicate to cement. The preferred proportions by weight of silicate to cement are 0.005 part to 0.10 part silicate per part cement, although proportions 0.0015 part to 0.30 part of silicate per part of cement may be used. Lower quantities of silicate do not give sufficient adherence of cement to aggregate and larger quantities have a detrimental effect on the strength of the concrete or mortar made from the pre-mix containing said larger amounts of silicate.

The preferred binder is sodium silicate in which the ratio of $Na_2O$ to $SiO_2$ on weight basis is 1 of the former to 1 to 4 of the latter and preferably 1.5 to 3.5 of the latter. Potassium silicate is more costly but can be used in place of sodium silicate on a weight for weight basis.

The amount of water in the sodium silicate solution is not critical but sufficient should be added to the sodium silicate so that the surface of the aggregate is covered with the silicate solution. Silicate solutions containing 2 to 10% sodium silicate are preferred but 0.2% to saturated solutions may be employed.

This application is a continuation-in-part of my co-pending application Ser. No. 505,550, filed May 2, 1955, now abandoned.

Since certain changes may be made in the aforesaid compositions and different embodiments of the invention could be made without departing from its scope, it is intended that all matter contained in the aforesaid description shall be interpreted as illustrative and not in a limiting sense.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to my novel compositions herein claimed without departing from the spirit of the invention. Particularly, it is to be understood that in said claims ingredients or components recited in the singular are intended to include compatible mixtures of said ingredients wherever the sense permits.

I claim:

1. A free flowing composition of matter comprising aggregate, the individual particles of said aggregate carrying water-soluble silicate binder and a finely divided hydraulic cement carried by said binder and being present thereon as a substantially dry dust coat whereby excessive separation of said hydraulic cement from said aggregate will not occur in normal transportation and storage of said composition of matter when packaged as a pre-mix, the ratio by weight of said cement to said silicate being 1 part of cement to 0.0015–0.30 part of silicate.

2. A free flowing composition of matter comprising aggregate, a water-soluble silicate binder carried by said aggregate and finely divided hydraulic cement carried by said binder and forming a dry coat thereon to render the same substantially dry for preventing excessive separation of said hydraulic cement in the course of normal transportation of said composition when packaged, the ratio by weight of said cement to said silicate being 1 part of cement to 0.005–0.10 part of silicate.

3. A packaged pre-mix, said pre-mix being substantially dry and free-flowing and comprising aggregate, a water soluble silicate coating on the individual parts of said aggregate, and finely divided hydraulic cement, said cement being bound to said aggregate by said silicate coating as a substantially dry dust whereby excessive separation of said hydraulic cement from said aggregate will not occur in normal transportation and storage of said packaged pre-mix, the ratio by weight of said cement to said aggregate being in the range of 10–70 parts of the former to 100 parts of the latter, the ratio by weight of said silicate to said aggregate being in the range of 0.1–5 parts of said silicate to 100 parts of said aggregate and the ratio by weight of said silicate to said cement being in the range of 0.005–0.10 part of said silicate to 1 part of said cement.

4. A packaged pre-mix, said pre-mix being substantially dry and free-flowing and comprisnig aggregate, sodium silicate coating on the individual parts of said aggregate, and finely divided hydraulic cement, said cement being bound to said aggregate by said silicate coating as a substantially dry dust whereby excessive separation of said hydraulic cement from said aggregate will not occur in normal transportation and storage of said packaged pre-mix, the ratio by weight of said cement to said aggregate being in the range of 10–70 parts of the former to 100 parts of the latter, the ratio by weight of said silicate to said aggregate being in the range of 0.2–1 part of said silicate to 100 parts of said aggregate and the ratio by weight of said silicate to said cement being in the range of 0.0015–0.3 part of said silicate to 1 part of said cement.

References Cited in the file of this patent

UNITED STATES PATENTS

| | | |
|---|---|---|
| 1,641,874 | Wert | Sept. 6, 1927 |
| 2,240,393 | Dietz | Apr. 29, 1941 |
| 2,342,574 | Denning | Feb. 22, 1944 |
| 2,439,650 | Cuno | Apr. 13, 1948 |
| 2,650,171 | Shaaf | Aug. 25, 1953 |